Figure 1:
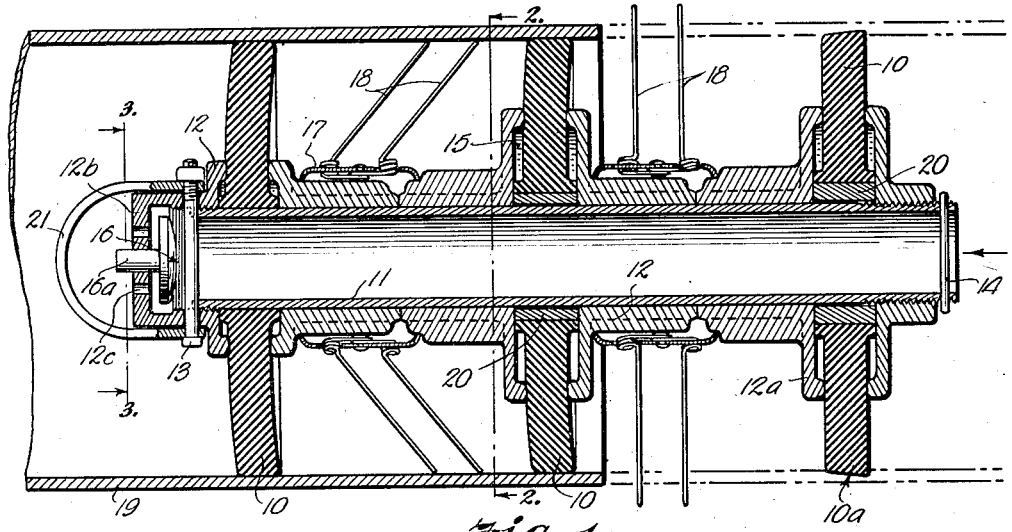

Jan. 1, 1946.  J. E. HALL  2,392,144

PIPE LINE CLEANER

Filed May 29, 1943

INVENTOR.
Jesse E. Hall
BY
ATTORNEY.

Patented Jan. 1, 1946

2,392,144

UNITED STATES PATENT OFFICE 2,392,144

PIPE-LINE CLEANER

Jesse E. Hall, Weatherford, Tex.

Application May 29, 1943, Serial No. 489,046

3 Claims. (Cl. 15—104.06)

My invention relates to new and useful improvements in pipe line cleaners, commonly called swabs or go-devils.

Pipe line cleaners are usually made up of a plurality of spaced flexible rubber discs mounted on an elongated central body. The discs have a pressure tight fit with the interior surface of the pipe so that fluid pressure in the line behind the cleaner propels it through the line. Swabs are usually used to clean accumulated deposits such as sand, wax, rust and incrustations from the line. It is also conventional practice to insert a swab in a line between different grades or types of fluids passing therethrough to prevent intermingling.

As the swab travels through the line it clears the line of incrustations and agitates deposits which are removed as suspensions in the fluid. The deposits are usually in the form of sediment in the bottom of the line. The distribution of the deposits in the bottom of the pipe causes the lower portions of the discs to be abraded much more rapidly than the other portions. As a result, the discs become unsymmetrical and must be replaced much sooner than would otherwise be necessary.

It is essential that the rubber discs be relatively stiff in order that the swab operate efficiently. The discs in their travel through the line are subjected to distortion and bending particularly when passing through curved or constricted sections of the line. Repeated bending of the stiff rubber disc adjacent the flanges which clamp them to the body soon causes the discs to rupture, split or break, making it necessary to frequently replace them. This condition is particularly aggravated just above the clamping flanges.

In addition to the above, it is very difficult to remove a conventional swab from the pipe line due to formation of a vacuum behind the swab as it is drawn through the outlet.

An important object of my invention is to provide a pipe line swab that rotates as it moves through the line, thus eliminating uneven wear of the discs and materially increasing their life span.

Another object of my invention is to provide a swab of the above mentioned character wherein the flanges clamping the discs to the body provide chambers into which the compressed disc material flows when the device passes through a curved or constricted portion of the line, thus relieving the stresses which cause cracking and splitting of the discs.

Still another object of my invention is to provide a pipe line swab that is uniquely constructed to automatically break the vacuum formed in the line behind the device, thereby facilitating removal of the swab from the line.

Other objects and advantages of my invention will be apparent during the course of the following description.

Figure 2:
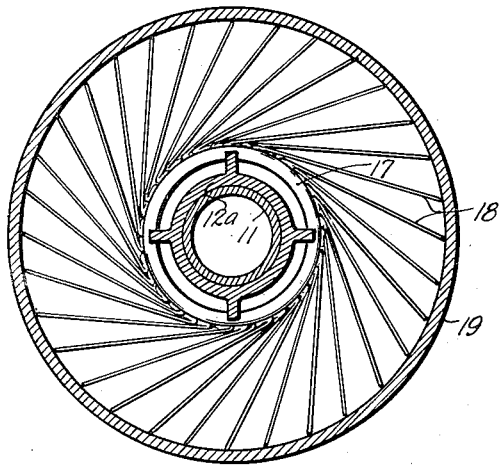
Figure 3:
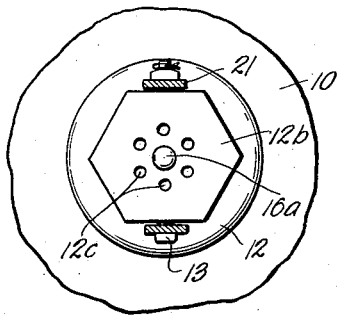
Figure 4:
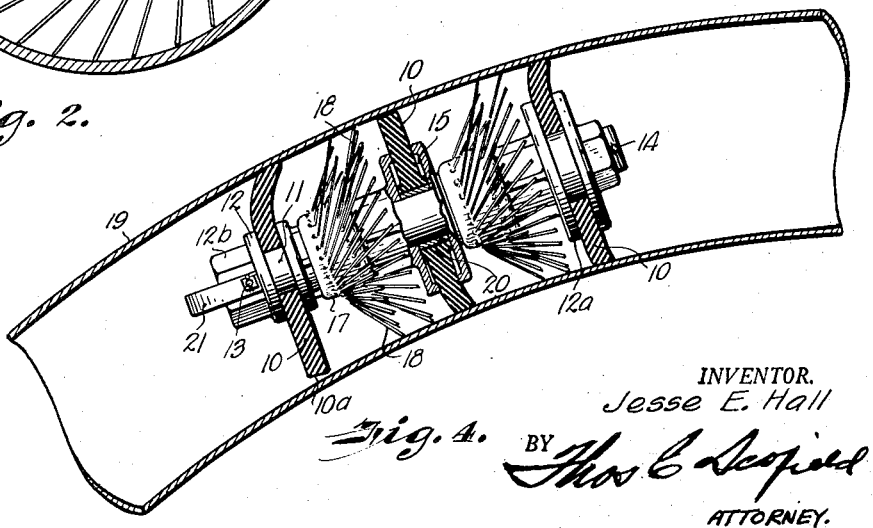

In the drawing forming a part of this specification and wherein like numerals are employed to designate like parts throughout the same, Fig. 1 is a longitudinal sectional view of a pipe line swab embodying my invention, Fig. 2 is a transverse sectional view taken on the line 2—2 of Fig. 1, Fig. 3 is a fragmentary transverse sectional view taken on the line 3—3 of Fig. 1, Fig. 4 is a longitudinal sectional view showing the swab embodying my invention passing through a curved section of the pipe line.

In the drawing wherein for the purpose of illustration is shown a preferred embodiment of my invention, the numeral 10 designates a plurality of rubber discs held in fixed spaced relation on a tubular body 11 by spacer sleeves 12. The foremost and rearmost of the sleeves 12 are threaded on the ends of body 11 and hold the sleeves pressed together and against the discs 10. The foremost sleeve is normally held stationary by a bolt 13 which extends transversely therethrough and fits in notches or recesses in the front end of body 11. The rearmost sleeve is held in place by a cotter pin 14.

The body 11 should be of sufficient length to bridge any opening into the line. I prefer that the device have at least three discs 10 since this provides more satisfactory operation and results preventing canting of the device in the line and loss of contact between the peripheries of the discs and the interior surface of the line. The device is here shown with three discs, although it is to be understood that a greater or lesser number of discs can be mounted on the body if desired.

The sleeves 12 adjacent discs 10 are formed with radial flanges 12a which securely hold or clamp the discs to the body. The faces of the flanges 12a adjacent the discs are concave to provide chambers 15 into which the flexible material of the discs flows when the discs are compressed. Flanges 12a supporting the foremost disc 10 are of lesser diameter than the flanges of the other discs in order to permit greater flexibility of the foremost disc and facilitate passage of the swab through joints and curved sections of the line.

The foremost sleeve 12 has an end 12b in which is slidably supported the stem 16a of valve 16. The rear end of body 11 is open. When pressure in the line behind the device exceeds the pressure in front of it, valve 16 slides forwardly to close ports 12c and when pressure behind the device is less than pressure in front of it, valve 16 automatically slides back against bolt 13 opening ports 12c.

In order to make the device rotate and at the same time clean deposits or incrustations from the inside surface of the pipe as it passes through, I provide between discs 10 collars 17 which carry flexible wire whiskers 18 of sufficient length to contact the interior surface of the pipe. Collars 17 have down-turned edges which fit against shoulders on sleeves 12. Whiskers 18 are spring-mounted and extend tangentially from collars 17. The flexible tangential mounting of the whiskers and their contact with the interior causes the device to rotate as it passes therethrough. Furthermore, the outer ends of the whiskers scratch against and remove incrustations and deposits from the inner surface of the line.

In operation, the device is inserted into a pipe 19 in the manner shown in Fig. 1. Discs 10 are slightly larger in diameter than the inner diameter of the pipe and their peripheries 10a are tapered to compensate for backward flexing of the discs when pushed into the line. The peripheries of the discs should snugly fit the inner surface of the pipe if an efficient cleaning action is to be obtained. The flexible wire whiskers 18 which make up the scratcher units are also flexed or bent upon being inserted into the pipe, and thereafter press against the inner surface of the pipe with sufficient force to effectively remove incrustations and produce rotation of the swab.

When fluid under pressure is admitted in the pipe line behind the swab, it enters body 11 through its open rear end and closes valve 16. The liquid pressure acting behind the discs and body propels the swab through the line. The device is usually sent from one pumping station to another, although it may be sent any desired distance.

Abrasion of the peripheries of the discs reduces their diameters and renders them relatively ineffective after short periods of use. The tangentially extending wire whiskers or scratcher units cause the swab to constantly rotate, thus assuring even wearing of the discs. Present day swabs do not rotate and as a consequence the discs are unevenly worn. However, I have found that if the discs are evenly worn their period of usefulness is substantially increased. When they no longer press against the pipe with the requisite pressure they can be expanded by insertion of suitable shims 20. The diameter of the shims is governed by the amount which it is desired to expand the discs.

Referring now to Fig. 4 it will be observed that when the swab passes through a curved section of the pipe 19, the upper portions of the front and rear discs and the lower portion of the middle disc are bent back abruptly. This continued distortion of the discs causes deterioration and cracking and splitting adjacent the tops of the flanges. By providing flow chambers 15, I have substantially eliminated this difficulty and disc failure. The discs compress and thicken when subjected to radial pressure and part of the flexible material retracting toward the body and flowing into chambers 15. This relieves stresses in the discs at the edges of flanges 12a.

To remove the swab from the pipe line the operator grasps bail 21 and pulls it through an outlet. As a vacuum forms behind the swab, valve 16 is automatically opened so that the pressures in front and behind the swab are equalized through ports 12c, and the swab is then easily removed.

It is to be understood that the swab shown in the drawing is to be considered as a preferred embodiment of the invention. Various changes in the size, shape, and arrangement of parts is contemplated and may be made without departing from the spirit of my invention or the scope of the appended claims.

Having thus described my invention, I claim:

1. In a pipe line swab an elongated central body, discs of flexible material mounted at spaced intervals on the body adapted to have a pressure tight fit with the interior surface of the pipe line, sleeves fixedly mounted on the body at opposite sides of the discs, said sleeves formed with rigid radial flanges having their peripheries positioned in opposed relation and against the sides of the discs to hold them stationary on the body, the flange surfaces confronting the discs being concave to provide closed flow chambers into which the material of the discs flows when said discs are radially compressed.

2. In a pipe line swab the combination of an elongated body, spaced apart propulsion discs of flexible material mounted on said body, a plurality of wire whiskers of a length to scratch the interior of the pipe, said whiskers attached to the body and having coils formed therein adjacent the body producing resilient mountings therefor, the free ends of the individual whiskers extending substantially tangentially and rearwardly from the body in a manner simulating substantially the trajectory of objects thrown from the surface of the body were the body rotated, whereby the swab is rotated on its longitudinal axis as it passes through the pipe.

3. In a pipe line swab an elongated body, spaced apart propulsion discs mounted on said body, sleeves mounted on the body adjacent both sides of the discs to position the discs on the body, said sleeves having concave surfaces confronting and supporting the discs intermediate their peripheries providing closed flow chambers to receive the material of the discs when the discs are radially compressed.

JESSE E. HALL.